United States Patent [19]
Michimoto et al.

[11] Patent Number: 5,825,915
[45] Date of Patent: Oct. 20, 1998

[54] OBJECT DETECTING APPARATUS IN WHICH THE POSITION OF A PLANAR OBJECT IS ESTIMATED BY USING HOUGH TRANSFORM

[75] Inventors: Yasuyuki Michimoto, Sagamihara; Katsumasa Onda; Masato Nishizawa, both of Yokohama, all of Japan

[73] Assignee: Matsushita Electric Industrial Co., Ltd., Osaka, Japan

[21] Appl. No.: 704,895

[22] Filed: Aug. 30, 1996

[30] Foreign Application Priority Data

Sep. 12, 1995 [JP] Japan .................................. 7-234019
Nov. 30, 1995 [JP] Japan .................................. 7-312677

[51] Int. Cl.$^6$ .................................................. G06T 17/00
[52] U.S. Cl. .......................... 382/154; 382/281; 382/291
[58] Field of Search .................................. 382/103, 104, 382/105, 106, 154, 173, 266, 281, 291; 356/3.14, 376; 348/116, 118, 119, 120

[56] References Cited

U.S. PATENT DOCUMENTS

| | | | |
|---|---|---|---|
| 5,202,928 | 4/1993 | Tomita et al. .......................... | 382/154 |
| 5,410,346 | 4/1995 | Saneyoshi et al. ...................... | 348/116 |
| 5,692,061 | 11/1997 | Sasada et al. .......................... | 382/106 |

OTHER PUBLICATIONS

Philip McLauchlan & John Mayhew, *Needles: A Stereo Algorithm for Texture*, Image Understanding and Machine Vision 1989, vol. 14, pp. 88–91, Jun. 1989.

"Drive Assist System by means of 3–D Image Recognition Technique", by K. Saneyoshi et al., Society of Automotive Engineerings of Japan, Inc., Society Conference Proceedings, 924 1992–10, pp. 169–172.

Image Understanding and Machine Vision, vol. 14, 12–14 Jun. 1989, Washington D.C., pp. 88–91, XP000671910, McLauchlan and Mayhew: "Needles: A Stereo Algorithm For Texture".

CVGIP Image Understanding, vol. 54, No. 3, 1 Nov. 1991, pp. 309–324, XP000331263, Bikash Sabata et al: "Estimation of Motion from a Pair of Range Images: A Review".

IEEE Transactions on Systems, Man and Cybernetics, vol. 24, No. 1, 1 Jan. 1994, pp. 144–152, XP000433143, Ze–Nian Li: "Stereo Correspondence Based on Line Matching in Hough Space Using Dynamic Programming".

Proceedings of the International Conference on Robotics and Automat, San Diego, May 8–13, 1994, vol. 2, Conf. 11, 8 May 1994, Institute of Electrical and Electronics Engineers, pp. 1060–1065, XP000478448, Tong F. et al: "Reciprocal–Wedge Transform in Motion Stereo".

*Primary Examiner*—David K. Moore
*Assistant Examiner*—Brian P. Werner
*Attorney, Agent, or Firm*—Pearne, Gordon, McCoy & Granger LLP

[57] ABSTRACT

Based on left and right images that have been taken by image pickup devices, a correlation processing section obtains parallax data as three-dimensional data of objects. At processing start time, a plane estimating section estimates the position of a planar object such as a road or a floor by utilizing the Hough transform based on the parallax data that have been obtained successfully for part of rectangular segments of the images, and interpolates the parallax data by using the position of the planar object. At a time point after the processing start time, a parallax variation detecting section detects an object by comparing current parallax data with the parallax data at the processing start time.

6 Claims, 9 Drawing Sheets x: UNDETERMINED PARALLAX DATA

OBJECT DETECTING APPARATUS IN WHICH THE POSITION OF A PLANAR OBJECT IS ESTIMATED BY USING HOUGH TRANSFORM

BACKGROUND OF THE INVENTION

1. Field of the Invention

The present invention relates to an object detecting apparatus utilizing stereo image processing which apparatus is effectively used for monitoring, measurement, etc.

2. Description of the Related Art

FIG. 2 is a flow diagram showing the configuration of a conventional object detecting apparatus, which will be described below in accordance with the operation flow.

Left and right images are taken by left and right image pickup devices 201 and 202 which are so disposed that their optical axes are parallel with each other. The left image is used as a reference image. As shown in FIG. 3, the left image is divided into M (horizontal)×N (vertical) rectangular segments. A correlation processing section 203 measures a deviation between image positions of the same object in the left and right images, i.e., a parallax of the object. The parallax is inversely proportional to the distance to an object.

As an example of a stereo image processing technique and a correlation technique, a description will be made of a method disclosed in K. Saneyoshi et al.: "Drive Assist System by means of 3-D Image Recognition Technique," Society of Automotive Engineers of Japan, Inc., Society Conference Proceedings 924 1992-10, pp., 169–172. In the following description, each rectangular segment of a left image 301, which consists of m×n pixels, is called a block 302. The brightness of an ith pixel of a block 302 is represented by $L_i$. As shown in FIG. 4, rectangular segments 403 each consisting of m×n pixels are also set in a right image 401, and the brightness of an ith pixel of a rectangular segment is represented by $R_i$. A similarity evaluation value C of rectangular segments of the left and right images 301 and 401 is given by $$C = \sum_{i=0}^{i<m\times n} |L_i - R_i|. \tag{1}$$

The similarity evaluation value C is calculated while the subject rectangular segment 403 is moved by one pixel at a time in the horizontal direction in a search area 402 of the right image 401. The search area 402 is an area which may include a segment corresponding to a left image block 302. A segment of the search area 402 having the minimum similarity evaluation value C is determined as a corresponding segment. According to this method, a corresponding segment can be determined for each block 302 of the left image 301. Once the corresponding segment is determined, a parallax can immediately be calculated from the coordinates of the segments corresponding to each other according to Equation (2):

$$S = X - X_R \tag{2}$$

where $X_R$ is the X coordinate of a rectangular segment of the right image 401 and X is the X coordinate of a block 302 of the left image 301.

A distance K to the object can be calculated according to Equation (3), which is generally known, from the parallax S that is determined for each block 302 of the reference left image 301:

$$K = \frac{2af}{S} \tag{3}$$

where 2a is a distance between the left and right image pickup devices 201 and 202 and f is a focal length of a lens used.

To distinguish among parallaxes S of the respective blocks 302, a parallax of the object which is measured for each block 302 is expressed as

S(X, Y) 1≦X≦M, 1≦Y≦N.

An image having parallax information is called a parallax image. In particular, a parallax image at processing start time $t_{START}$ is called an initial parallax image, to distinguish it from a parallax image at time t ($>t_{START}$).

By comparing parallaxes of the same block 302 of a parallax image at time t (present time) and that at time $t_{START}$ (past time), a parallax variation detecting section 204 judges that a new object has appeared or an object has disappeared in a block 302 with which a parallax variation larger than a given threshold has occurred.

Now, the Hough transform will be described with reference to FIG. 5. A straight line 501 on the x-y plane is expressed as $$\rho_0 = x \cos \theta_0 + y \sin \theta_0 \tag{4}$$

where $\rho_0$ is the length of a perpendicular 502 dropped from the origin O toward the straight line 501 and $\theta_0$ is an angle formed by the perpendicular 502 and the x axis.

Equation (5) is defined for each of a series of points ($x_i$, $y_i$), i=0, 1, 2, ... on the x-y plane:

$$\rho = x_i \cos \theta + y_i \sin \theta \tag{5}$$

On the ρ-θ plane, Equation (6) is expressed as a composite sinusoidal function called a Hough curve as shown in FIG. 6, and represents every straight line passing through the point ($x_i$, $y_i$). Where the points ($x_i$, $y_i$) are approximately located on a straight line, their Hough curves on the ρ-θ plane cross each other in the vicinity of a single point 601 as shown in FIG. 6. The straight line on the x-y plane (see Equation (4)) is determined by point 601 ($\rho_0$, $\theta_0$) where most Hough curves cross each other. The above operation is called straight line fitting by the Hough transform. Since the straight line fitting by the Hough transform is a straight line detecting method with recognition of a general tendency of a series of data points, a straight line can be detected even if the data points include points that are not located on that line.

The above object detecting apparatus is required to be able to correctly estimate the position, in a three-dimensional space, of a relatively large planar object such as a road, a floor, or a wall which is to serve as a reference for object detection judgment.

In the above object detecting apparatus, when rectangular segments of left and right images 301 and 401 are correlated with each other by the correlation processing section 203, a segment of the right image 401 which makes the similarity evaluation value C smallest is employed as a corresponding segment. However, there may occur a case that because of a small number of features, a segment that makes the similarity evaluation value C smallest cannot be obtained clearly for part of blocks 302 of a planar object and hence parallax data cannot be calculated therefor. This means that the object detecting apparatus cannot perform correct detection which apparatus operates on the assumption that parallax data are obtained almost completely in initial and current parallax images.

Further, in the convention correlation processing, a parallax-related distance measurement range 703 (see FIG. 7) is set in consideration of an object closest to and an object most distant from image pickup devices 702, and is fixed irrespective of the position in an image. However, in almost all cases, an object to be detected is located closer to the image pickup devices 702 than a plane object 701 such as a road, a floor, or a wall is, and the plane object 701 does not extend perpendicularly to the optical axes of the image pickup devices 701. This means that the amount of calculation is unduly large in the conventional technique because the parallax determination is performed in vain in a range which includes no object for distance measurement.

SUMMARY OF THE INVENTION

A first object of the present invention is to correctly estimate a three-dimensional position of a planar object by a global straight line approximation technique utilizing the Hough transform, without being affected by objects other than the planar object.

A second object of the invention is to perform object detection with high accuracy by estimating the position of a planar object and inserting proper data for undetermined parallax data of the same plane object by interpolation.

A third object of the invention is to reduce the amount of correlation calculation by optimizing the parallax determination range for each block position of an image based on information of an estimated position of a plane object.

To attain the above objects, the invention has a general feature that the position of a planar object is estimated by Hough transform processing based on successfully measured parallel data.

According to a first aspect of the invention, there is provided an object detecting apparatus comprising:

a plurality of image pickup means disposed at a predetermined interval, for producing a plurality of images;

a correlation processing section for producing three-dimensional data of objects according to triangulation through correlation between the plurality of images; and a plane estimating section for estimating a position of a planar object in a three-dimensional space by performing Hough transform on the three-dimensional data.

With this configuration, the position of a planar object such as a road, floor, or a wall can be estimated accurately without being affected by three-dimensional data of other objects by globally estimating the position of a planar object that occupies a most part of images based on successfully measured three-dimensional data by using the Hough transform.

According to a second aspect of the invention, there is provided a plane estimating method comprising the steps of:

receiving a plurality of images that are produced by a plurality of image pickup means disposed at a predetermined interval;

calculating three-dimensional data $S(X, Y)$; $1 \leq X \leq M$, $1 \leq Y \leq N$ for each of rectangular segments obtained by dividing the received images into M parts in a horizontal direction and into N parts in a vertical direction through correlation between the received images;

determining a plane passage straight line $L(Y)$ by performing Hough transform on M three-dimensional data corresponding to rectangular segments belonging to a horizontal area $GL(Y)$ of the received images;

performing the determining step on all horizontal areas $GL(Y)$, $1 \leq Y \leq N$, to thereby determine N plane passage straight lines $L(Y)$, $1 \leq Y \leq N$; and estimating a position of a planar object in a three-dimensional space based on the N plane passage straight lines $L(Y)$, $1 \leq Y \leq N$.

With the above method, the position of a planar object can be estimated in a global manner without being affected by other objects because the Hough transform processing is conducted to approximate plane passage straight lines.

In the above plane estimating method, there may additionally be provided the steps of:

calculating an angle $\theta(Y)$ of a perpendicular to both of a Y axis and each of the N plane passage straight lines $L(Y)$, $1 \leq Y \leq N$, to obtain N angles $\theta(Y)$, $1 \leq Y \leq N$;

calculating a central angle value $\theta_R$ of the N angles $\theta(Y)$, $1 \leq Y \leq N$; and replacing all of the angles $\theta(Y)$, $1 \leq Y \leq N$ with the central angle value $\theta_R$, to obtain N angle-corrected plane passage straight lines $L'(Y)$, $1 \leq Y \leq N$, wherein the estimating step estimates the position of the planar object based on the N angle-corrected plane passage straight lines $L'(Y)$, $1 \leq Y \leq N$.

Since the angles $\theta(Y)$ should be the same for all the plane passage straight lines, the reliability of the angles of all the plane passage straight lines can be improved by replacing the angles $\theta(Y)$ with the most reliable angle value $\theta_R$.

Further, in the above plane estimating method, there may additionally provided the steps of:

calculating a distance $\rho(Y)$ between the origin of a coordinate system of the three-dimensional data $S(X, Y)$ and each of the N angle-corrected plane passage straight lines $L'(Y)$, $1 \leq Y \leq N$, to obtain N distances $\rho(Y)$, $1 \leq Y \leq N$;

determining a distance correction line by performing Hough transform on the N distances $\rho(Y)$, $1 \leq Y \leq N$; and translating the N angle-corrected plane passage straight lines $L'(Y)$, $1 \leq Y \leq N$ so that they intersect the distance correction line, to obtain N distance-corrected plane passage straight lines $L''(Y)$, $1 \leq Y \leq N$, wherein the estimating step estimates the position of the planar object based on the N distance-corrected plane passage straight lines $L''(Y)$, $1 \leq Y \leq N$.

With the above method, the reliability of the distances $\rho(Y)$ from the origin of the respective plane passage straight lines can be improved.

According to a further aspect of the invention, there is provided an object detecting apparatus comprising:

a plurality of image pickup means disposed at a predetermined interval, for producing a plurality of images;

means for producing three-dimensional data of objects for respective rectangular segments of the plurality of images;

a plane estimating section for estimating a position of a planar object in a three-dimensional space based on the three-dimensional data;

means for producing, by using the position of the planar object, three-dimensional data for part of the rectangular segments for which three-dimensional data could not be produced, to obtain interpolated three-dimensional data; and means for detecting an object that is located at a position different than the planar object when viewed from the plurality of image pickup means based on the interpolated three-dimensional data.

With this configuration, a failure of object detection due to undetermined parallax data can be prevented by estimating the position of a planar object such as a road, floor, or a wall, and producing three-dimensional data for undetermined ones of the same planar object through an interpolating operation by using the estimated position of the planar object. As a result, an object that is distant from the planar object can be detected more accurately.

According to still another aspect of the invention, there is provided an object detecting apparatus comprising:

a plurality of image pickup means disposed at a predetermined interval, for producing a plurality of images;

means for estimating a position of a planar object in a three-dimensional space based on the plurality of images; and means for producing three-dimensional data of an object except for an object that is more distant from the plurality of image pickup means than the planar object is.

With this configuration, the amount of correlation calculation can be reduced because three-dimensional data is not measured for an object that is more distant from the image pickup devices than a planar object such as a road, a floor, or a wall is.

DESCRIPTION OF THE PREFERRED EMBODIMENTS

Embodiments of the present invention will be hereinafter described with reference to the accompanying drawings.
Embodiment 1

Figure 1:
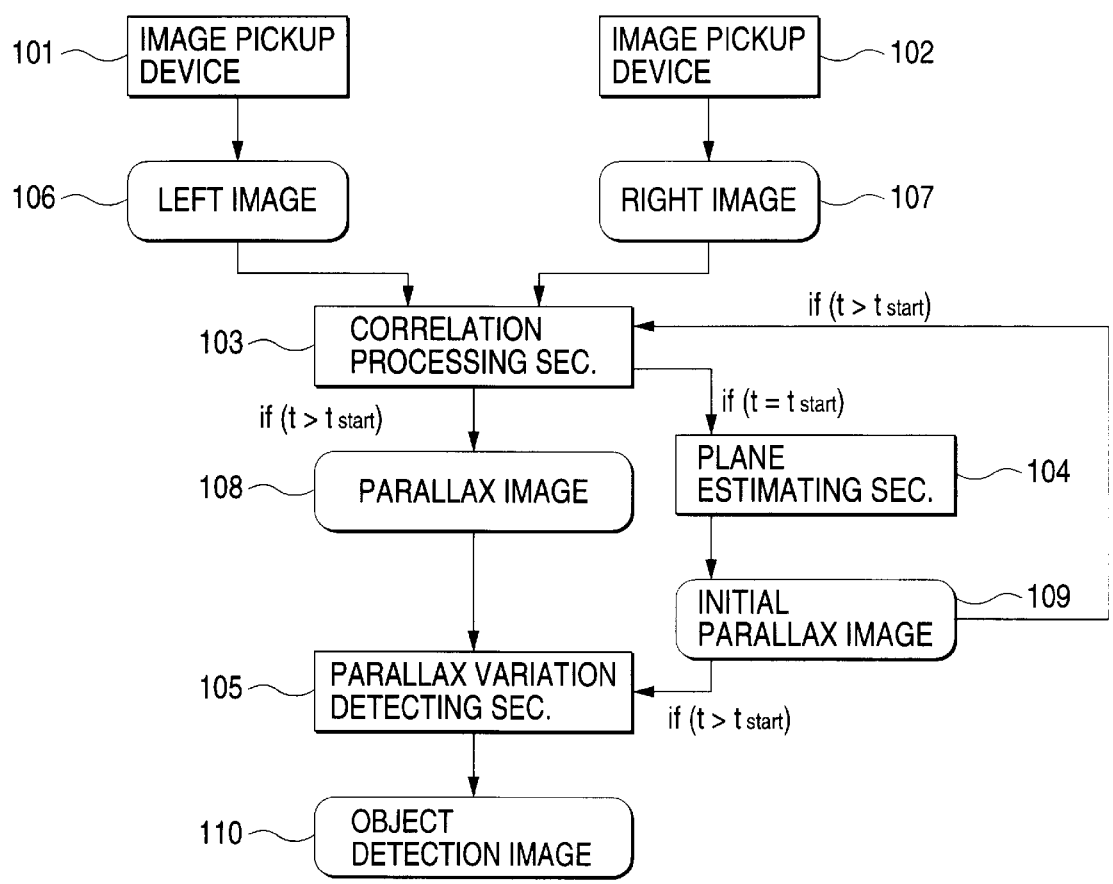
FIG. 1 is a flow diagram showing the configuration of an object detecting apparatus having a plane estimating section according to a first or third embodiment of the present invention.
Figure 2:
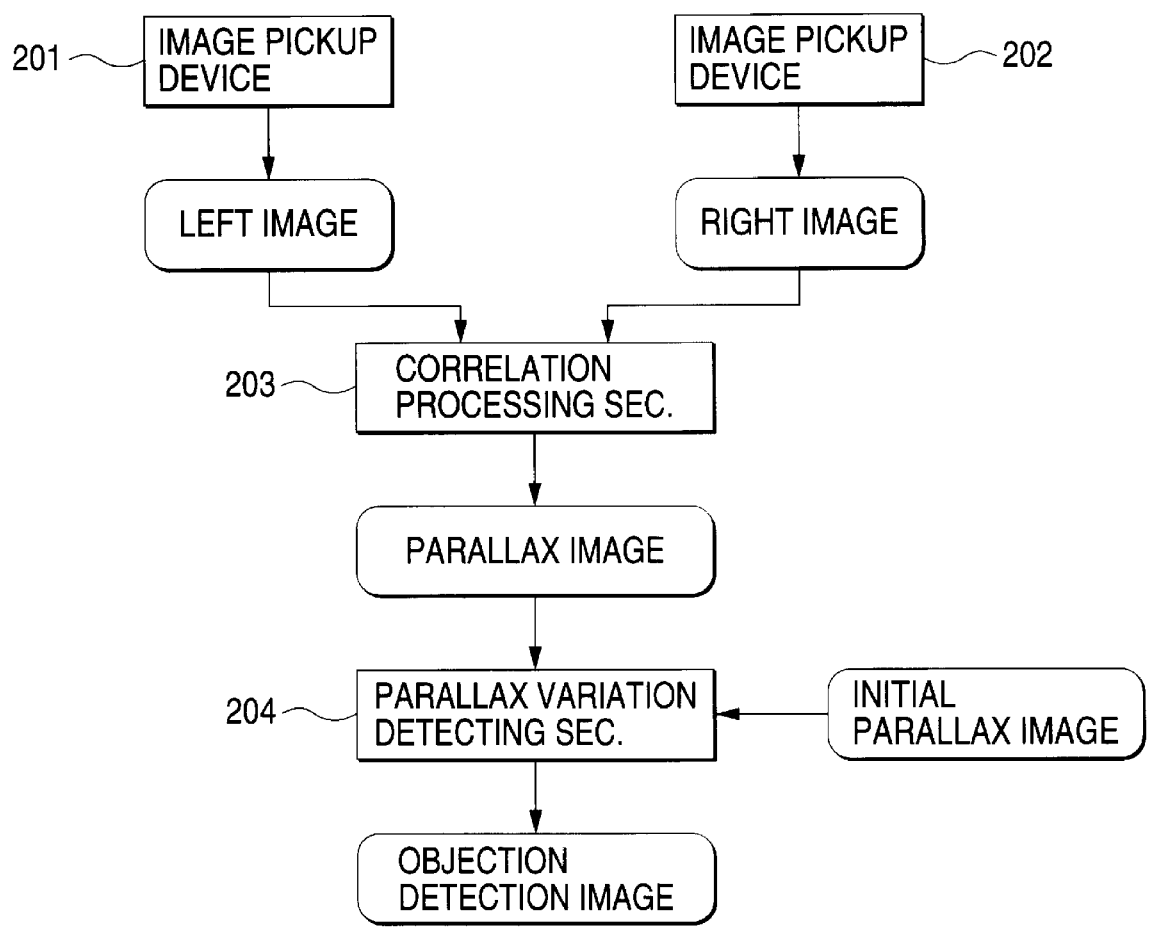
FIG. 2 is a flow diagram showing the configuration of a conventional object detecting apparatus.

FIG. 1 shows the configuration of an object detecting apparatus according this embodiment. In this object detecting apparatus, of left and right images 106 and 107 taken by image pickup devices 101 and 102, the left image 106 is divided into M (horizontal)×N (vertical) blocks. A correlation processing section 103 acquires a parallax S(X, Y) as three-dimensional data of an object on a block-by-block basis. A plane estimating section 104 estimates the position of a planar object by using parallaxes successfully measured by the plane estimating section 104. A parallax variation detecting section 105 extracts a block with which the parallax of a parallax image 108 at time t has varied from that of an initial parallax image 109 at processing start time $t_{START}$ (<t) by more than a threshold TH, and judges that there exists a new object at a position indicated by the block.

The operation of the object detecting apparatus having the above configuration will be described with reference to FIG. 1. Separate descriptions will be made of a stage where images are input at processing start time $t_{START}$ and a stage where images are input at time t (>$t_{START}$).

At the first stage, images taken at time $t_{START}$ are input to the correlation processing section 103, where the left and right images 106 and 107 are correlated with each other and information of positional deviations between the images 106 and 107, that is, parallaxes S are produced. The parallax is a kind of three-dimensional data. The parallaxes S(X, Y) of respective blocks obtained by dividing the left image 106 are input to the plane estimating section 104, which estimates the position of a plane object in the real space by using successfully measured parallaxes S(X, Y), and outputs an initial parallax image 109 including the parallaxes S(X, Y) of the respective blocks. Further, the plane estimating section 104 performs interpolation to produce parallaxes for blocks with which the parallax measurement failed in the above attempt.

At the second stage (time t>$t_{START}$), the operation performed in the part upstream of the correlation processing section 103 and the section 103 itself (see FIG. 1) is the same as in the first stage. The parallax variation detecting section 105 detects parallax variations larger than a threshold TH by comparing, for each block, a parallax S(X, Y) of a parallax image 108 at time t with that of the parallax image 109 at time $t_{START}$. A variation over time in parallax means appearance or disappearance of an object. Therefore, the parallax variation detecting section 105 outputs the blocks having a variation (larger than TH) in parallax as an object detection image 110 by, for instance, marking it.

Since a planar object such as a road, a floor, or a wall has a smaller number of features, it is difficult for conventional stereo image ranging means to correlate segments of a planar object. In contrast, in the invention that is provided with the plane estimating section 104, object detection by use of a temporal variation in parallax can be performed by estimating the position of a plane object and inserting proper data for unmeasured parallaxes of the plane object.
Embodiment 2

In this embodiment, a plane estimating scheme will be described with an assumption that a left image 106 (reference image) is divided into M (horizontal)×N (vertical) blocks and parallax data S(X, Y) (three-dimensional data) are obtained for blocks with which a parallax has been determined successfully.

Figure 8:
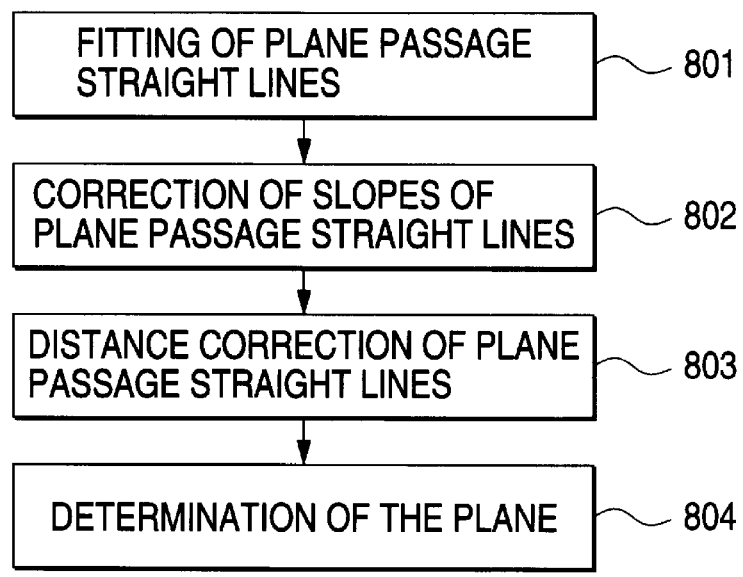
FIG. 8 is a flowchart showing a plane estimating scheme according to a second embodiment of the invention.
Figure 9:
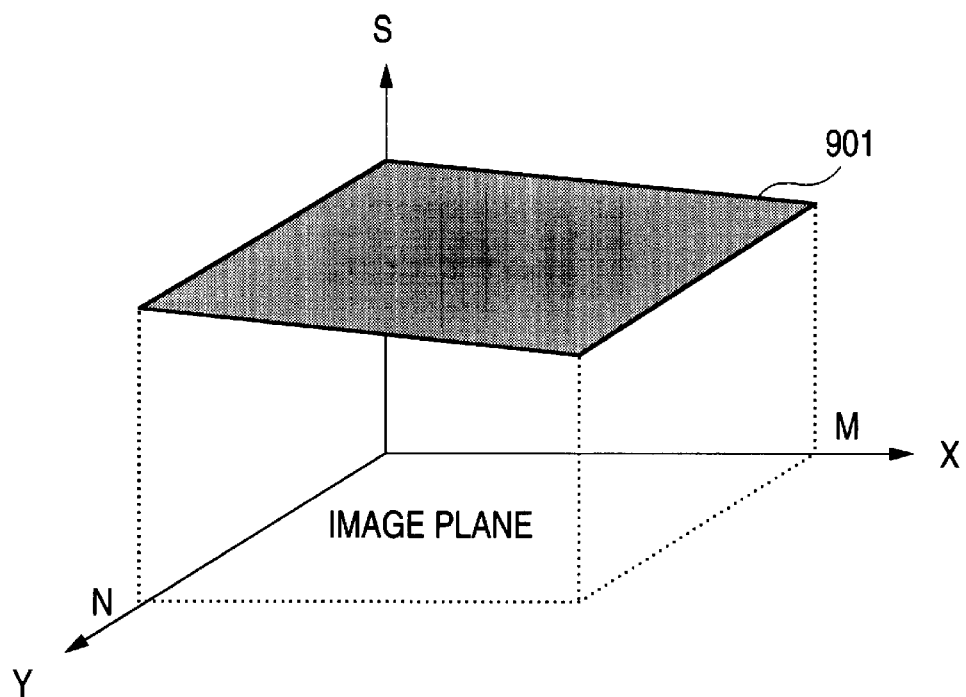
FIG. 9 shows a three-dimensional reference coordinate system used in the second embodiment.

FIG. 8 is a flowchart showing the plane estimating scheme according to this embodiment, which will be described below in order.

[Step 801: Fitting of plane passage straight lines]

Figure 3:
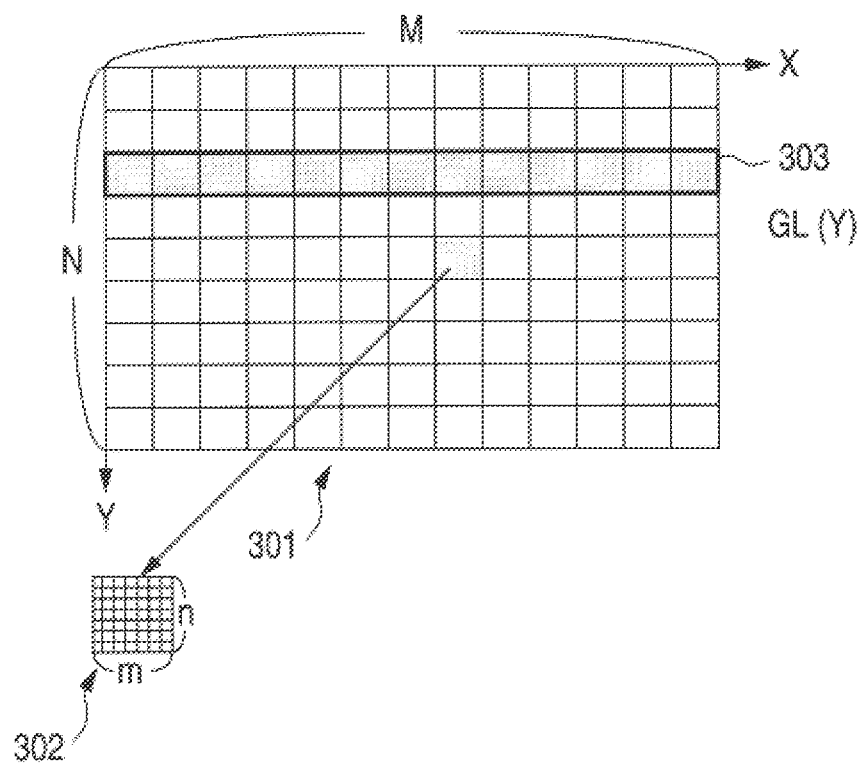
FIG. 3 illustrates how blocks are arranged in a left image, i.e., reference image.
Figure 4:
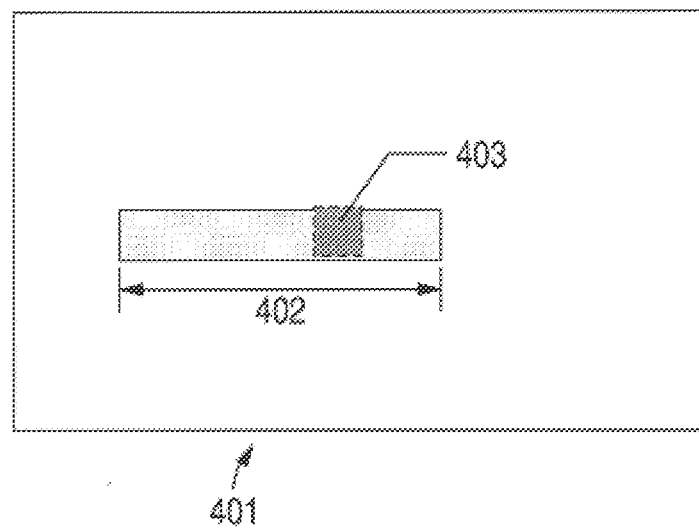
FIG. 4 illustrates a parallax search area of a right image in the conventional technique.
Figure 5:
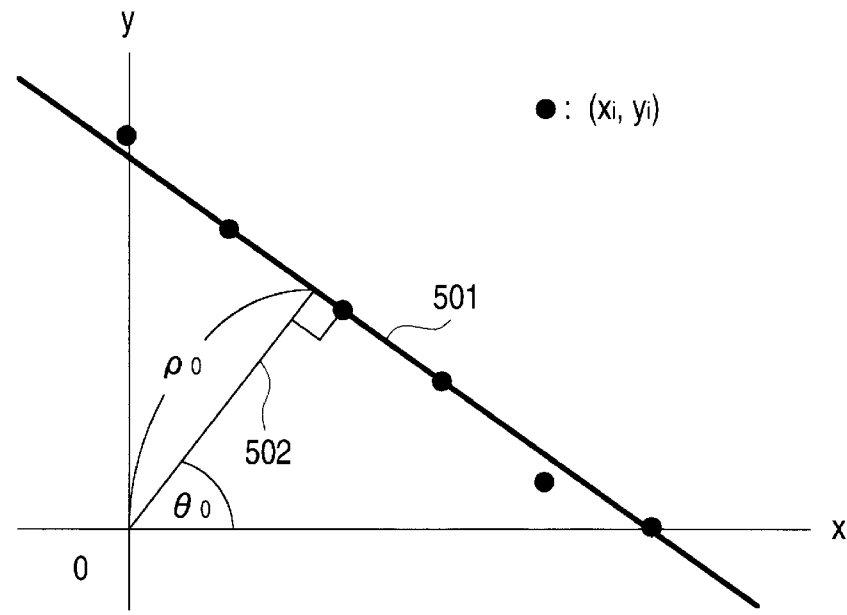
FIG. 5 shows straight line parameters used for the Hough transform.
Figure 6:
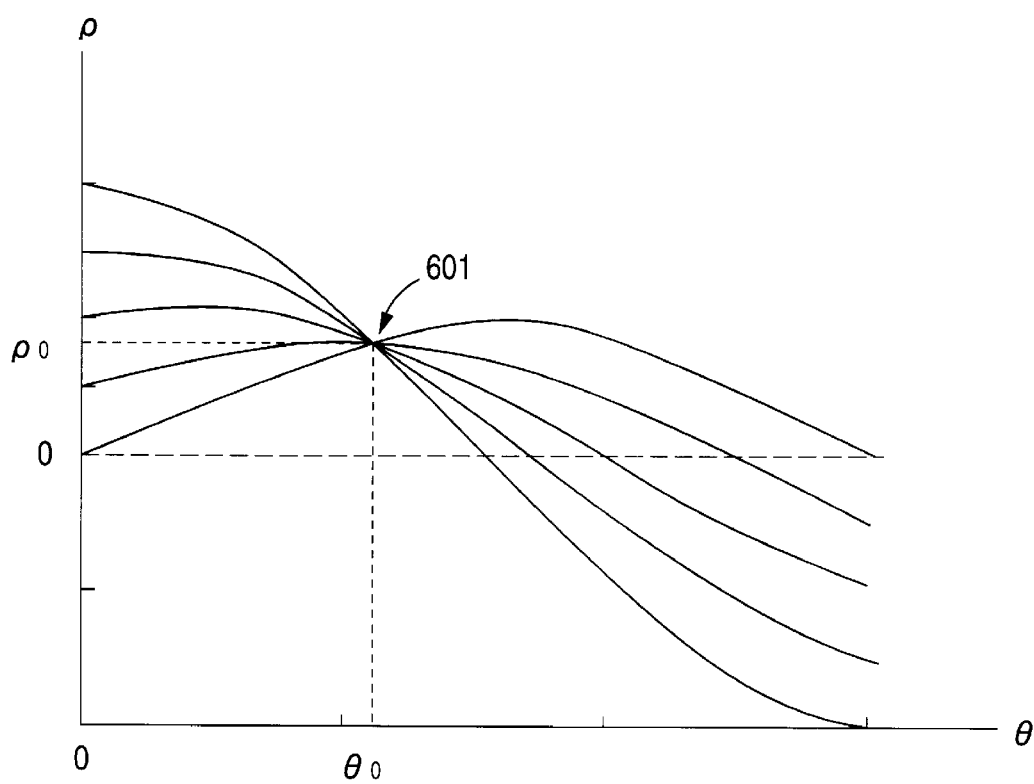
FIG. 6 shows an example of Hough curves.

FIG. 3 illustrates how blocks 302 are arranged on a left image 301. For convenience of description, the blocks 302 are expressed as BL(X, Y) 1≦X≦M, 1≦Y≦N
where X and Y are called indices. Further, in the following description of the plane estimating scheme, a three-dimensional, S-X-Y reference coordinate system will be used which consists of the axes representing the indices X and Y, and the parallax data S(X, Y).

Referring to FIG. 3, an area 303 enclosed by a solid-line frame is an area generated by varying the index X of the block B (X, Y) while fixing the index Y. These areas 303 are expressed as

GL(Y) 1≦Y≦N.

Figure 10:
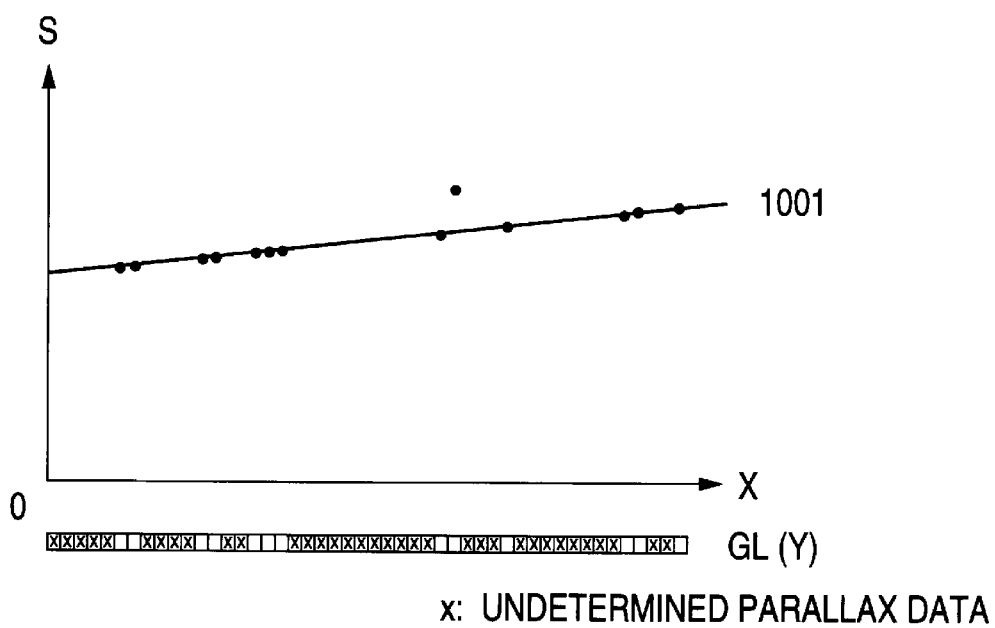
FIG. 10 shows fitting of a plane passage straight line in the second embodiment.
Figure 11:
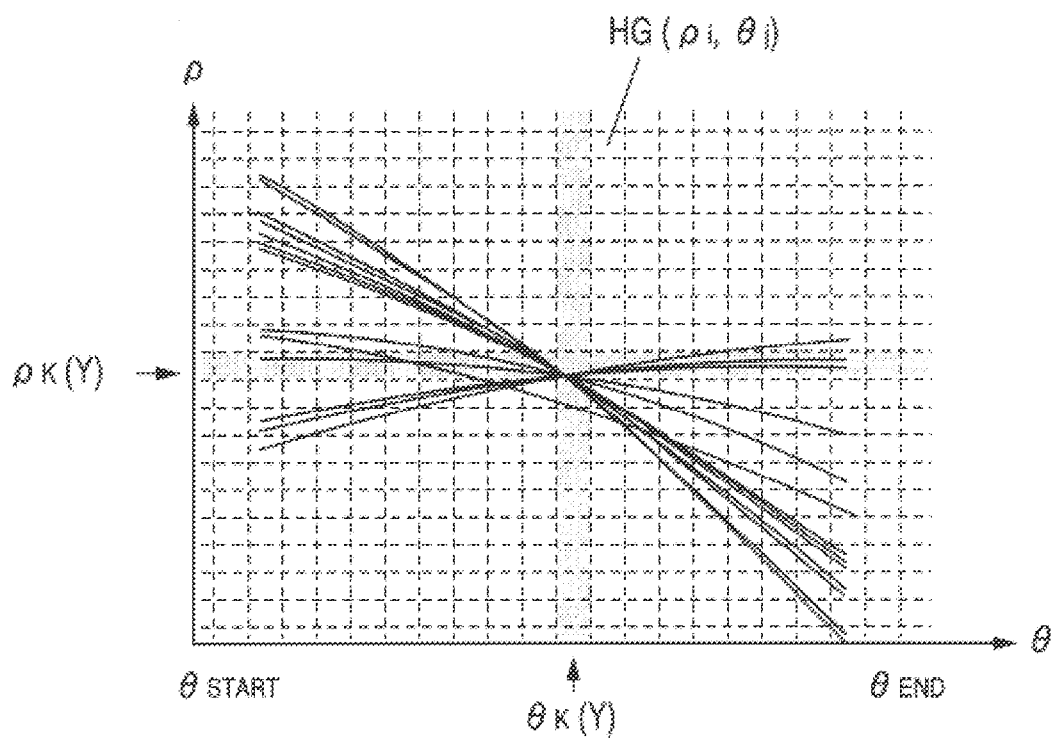
FIG. 11 illustrates straight line approximation with the Hough transform in the second embodiment.

The area GL(Y) is associated with M parallax data S at the maximum. As shown in FIG. 10, parallax data S(X, Y) are plotted for respective blocks included in the area GL(Y), in which the vertical axis represents the parallax data S of a block and the horizontal axis represents the index X of a block. Since the index Y is fixed, the fitting of a plane passage straight line will be described such that points in the S-X-Y reference coordinate space are projected onto the S-X plane. Each plotted point (S(X, Y), X) is substituted into Equation (6), so that a single Hough curve corresponding to that point is obtained by varying the angle θ in a given range. FIG. 11 shows Hough curves on the ρ-θ plane corresponding to all of the points (S(X, Y), X).

$$\rho = X \cos\theta + S(X, Y) \sin\theta, \quad \theta_{START} \leq \theta \leq \theta_{END} \tag{6}$$

A point $(\rho_K(Y), \theta_K(Y))$ where most Hough curves cross each other is obtained on the ρ-θ plane, and a straight line 1001 on the S-X plane is determined as Equation (7) by substituting the point $(\rho_K(Y), \theta_K(Y))$ into Equation (6):

$$S(X, Y) = -\frac{\cos\theta_K(Y)}{\sin\theta_K(Y)} X + \frac{\rho_K(Y)}{\sin\theta_K(Y)} \tag{7}$$

A point where most Hough curves cross each other on the ρ-θ plane is obtained in the following manner. A two-dimensional array $HG(\rho_i, \theta_j)$ representing frequencies of the respective points on the ρ-θ plane are defined as shown in FIG. 11. The frequency of an element $HG(\rho_i, \theta_j)$ is incremented by one every time a Hough curve passes through a point $(\rho_i, \theta_j)$. A point $(\rho_K(Y), \theta_K(Y))$ where most Hough curves cross each other on the ρ-θ plane is found by determining an element of the two-dimensional array $HG(\rho_i, \theta_j)$ having the largest frequency.

Figure 12:
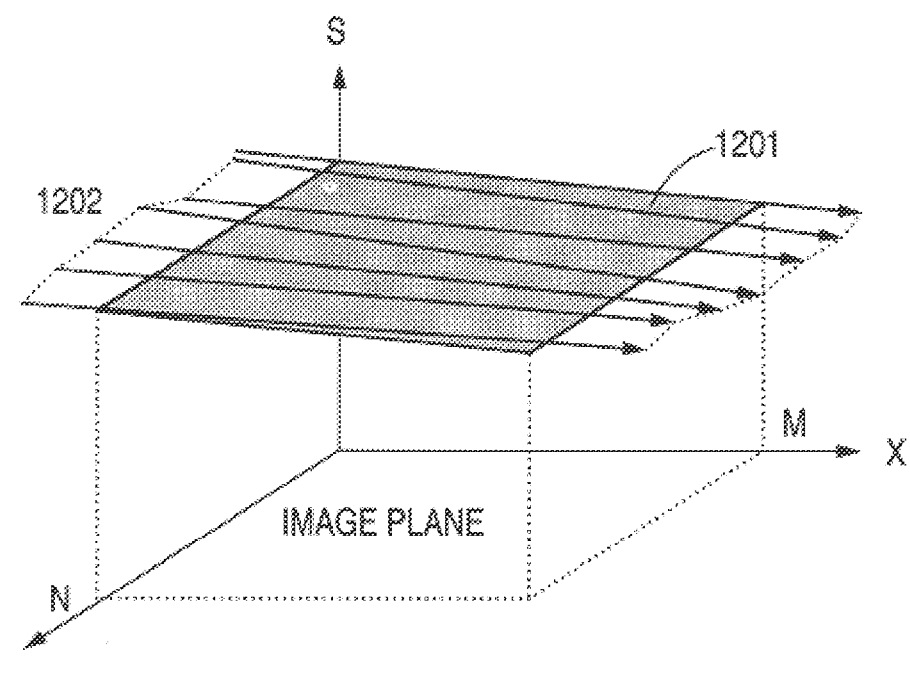
FIG. 12 shows a result of step 801 of the plane estimating scheme according to the second embodiment.

The above operation is performed on the parallax data S of all the areas GL(Y), 1≦Y≦N, so that N plane passage straight lines are obtained in total. FIG. 12 shows those straight lines drawn in the S-X-Y reference coordinate space. Since the angle $\theta_K(Y)$ of a perpendicular and the distance $\rho_K(Y)$ from the Y axis include error components $\theta_E(Y)$ and $\rho_E(Y)$, they are written as $$\theta_K(Y) = \theta_R + \theta_E(Y)$$

$$\rho_K(Y) = \rho_R(Y) + \rho_E(Y) \tag{8}$$

where $\theta_R$ and $\rho_R(Y)$ are their highly reliable values. That is, at the present stage the plane passage straight lines not necessarily exist on the same plane, and this will be corrected by the following operations.

[Step 802: Correction of slopes of plane passage straight lines]

If all the plane passage straight line existed on the same plane, the angles $\theta_K(Y)$ formed by the perpendiculars to the Y axis (projections onto the S-X plane) of all the straight lines and the X axis should have the same value. Therefore, a center value $\theta_R$ is determined by sorting magnitudes of the angles $\theta_K(Y)$, and all the angles $\theta_K(Y)$ are replaced by the center value $\theta_R$. Thus, the angles $\theta_K(Y)$ formed by the perpendiculars of the respective plane passage straight lines and the X axis are now represented by the most reliable slope angle $\theta_R$. Stated in terms of formulae, Equation (9) corresponds to the case where the angles $\theta_K(Y)$ of the respective plane passage straight lines include the error components $\theta_E(Y)$, and Equation (10) corresponds to the case where the error components $\theta_E(Y)$ are removed from the angles $\theta_K(Y)$ of all the straight lines by replacing the angles $\theta_K(Y)$ with the most reliable angle $\theta_R$.

$$S(X, Y) = -\frac{\cos(\theta_R + \theta_E(Y))}{\sin(\theta_R + \theta_E(Y))} X + \frac{\rho_R + \rho_E(Y)}{\sin(\theta_R + \theta_E(Y))} \tag{9}$$

$$S(X, Y) = -\frac{\cos\theta_R}{\sin\theta_R} X + \frac{\rho_R + \rho_E(Y)}{\sin\theta_R} \tag{10}$$

Figure 13:
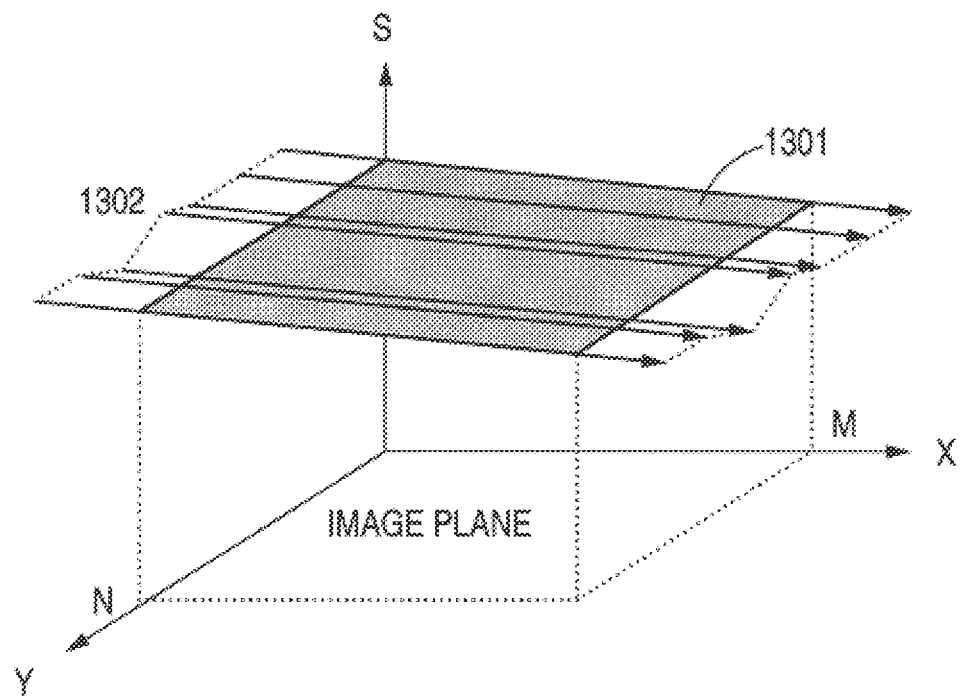
FIG. 13 shows a result of step 802 of the plane estimating scheme according to the second embodiment.

As a result of the above operation, the slopes of the plane passage straight lines, which were different from the slope of the plane as defined by the angle of a perpendicular to the Y axis, are now corrected. At the present stage, all the plane passage straight lines have the same slope as shown in FIG. 13 in which they are drawn in the S-X-Y reference coordinate space.

Figure 14:
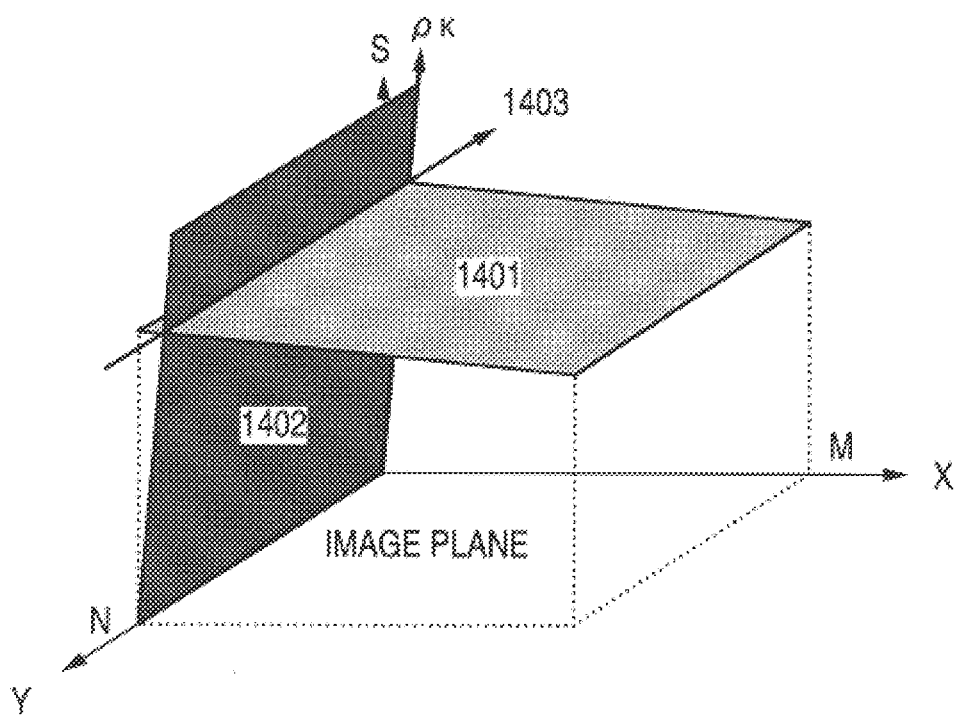
FIG. 14 shows a distance correction line in the second embodiment.
Figure 15:
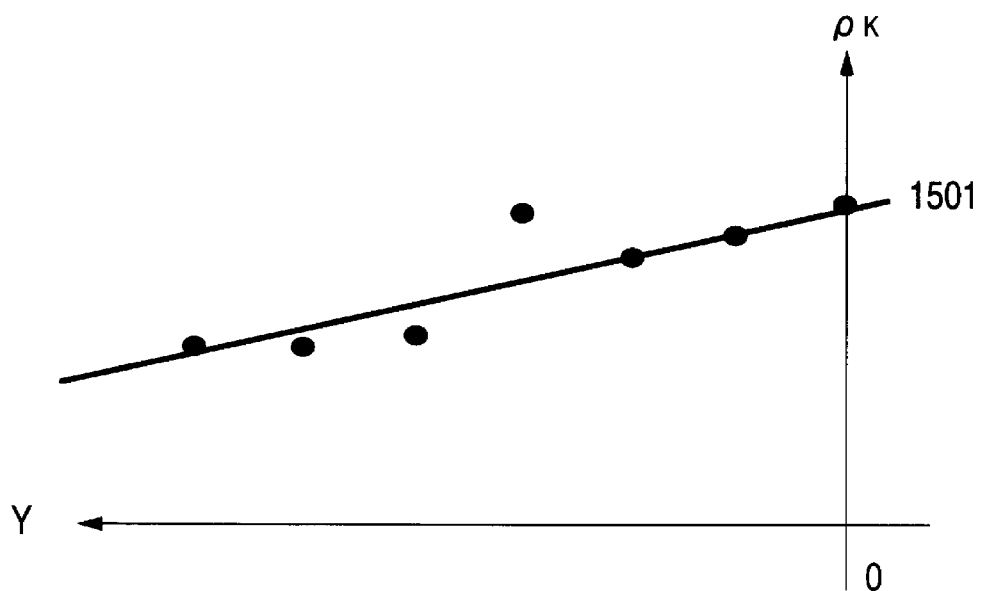
FIG. 15 shows fitting of the distance correction line in the second embodiment of the invention.

[Step 803: Distance correction of plane passage straight lines]

Where there exist two non-parallel planes in a three-dimensional space, they should have a straight crossing line. Based on this fact, as shown in FIG. 14, a straight line formed by a plane 1401 to be estimated and a Y-$\rho_K$ plane 1402 is determined by utilizing the Hough transform. The $\rho_K$ axis is an axis that is inclined from the X-axis by $\theta_R$. Distances $\rho_K(Y)$ from the Y axis of the respective straight lines are plotted on the Y-$\rho_K$ plane as shown in FIG. 15. Plotted points (Y, $\rho_K$) on the Y-$\rho_K$ plane are subjected to the Hough transform according to Equation (11).

$$\rho' = Y \cos\theta' + \rho_K(Y) \sin\theta', \quad \theta'_{start} \leq \theta' \leq \theta'_{end} \tag{11}$$

After a point $(\rho'_s, \theta'_s)$ where most Hough curves cross each other on the ρ'-θ' plane is found, a straight line 1501 is determined by using Equation (11). Since the straight line 1501 indicates distances from the Y axis which are considered most suitable for the respective plane passage straight lines, it is called a distance correction line. In FIG. 14, the distance correction line is denoted by numeral 1403. The distance correction line is expressed as $$\rho_R(Y) = -\frac{\cos\theta'_s}{\sin\theta'_s} Y + \frac{\rho'(Y)}{\sin\theta'_s}. \tag{12}$$

Figure 16:
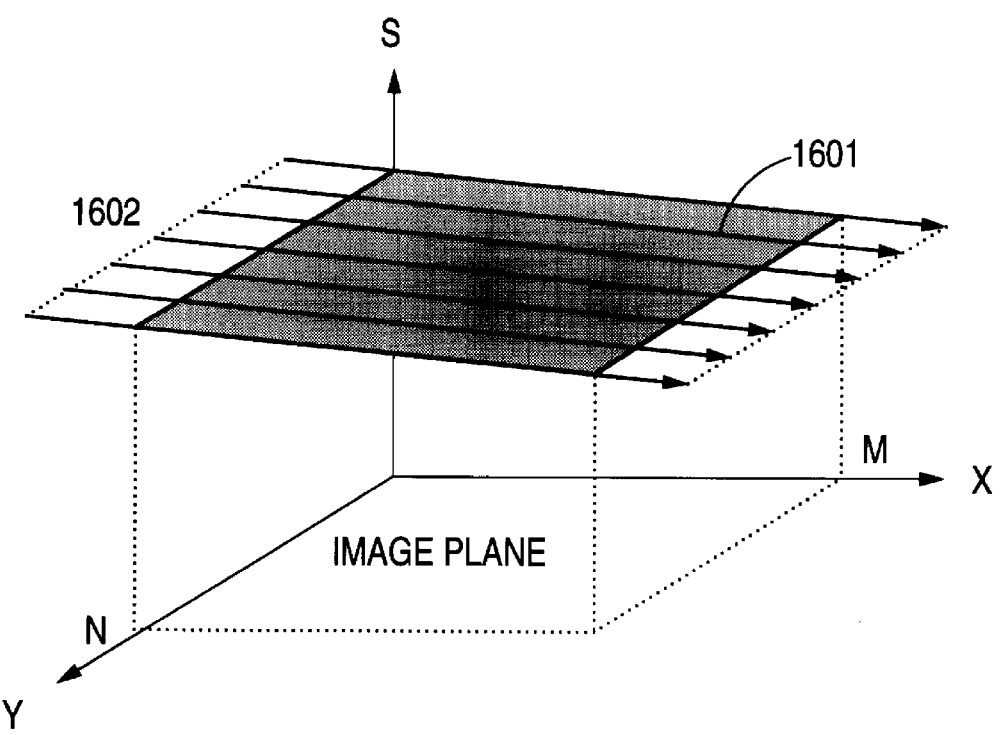
FIG. 16 shows a result of step 803 of the plane estimating scheme according to the second embodiment.

By correcting the distances $\rho_K(Y)$ from the Y axis of the respective plane passage straight lines into $\rho_R(Y)$ by using the distance correction line 1403, Equation (10) is changed to $$S = -\frac{\cos\theta_R}{\sin\theta_R} X + \frac{\rho_R(Y)}{\sin\theta_R} \tag{13}$$

where the error components are removed completely. As shown in FIG. 16, all the straight lines exist on the same plane in the S-X-Y reference coordinate space.

[Step 804: Determination of the plane]

As a result of the above steps, all the straight lines are now exist on the same plane; that is, the plane is approximated by the straight lines passing through it. Even if the plane include undetermined parallax data S(X, Y), they can be determined by interpolation by using a straight line represented by Equation (13) which corresponds to an area GL(Y).

Embodiment 3

Again referring to FIG. 1, in an object detecting apparatus according to this embodiment, a correlation processing section 103 correlates left and right images 106 and 107 taken by image pickup devices 101 and 102. The operation of the correlation processing section 103 will be described separately for a stage at processing start time $t_{START}$ and a stage at time t ($>t_{START}$). It is assumed that, as in the case of the first and second embodiments, the left image (reference image) 106 is divided into M (horizontal)×N (vertical) blocks and parallax data have been obtained for blocks with which corresponding segments have been found.

At time $t_{START}$, the maximum value $d_{max}$ and the minimum value $d_{min}$ of a parallax measurement range are set at proper values in accordance with distances to objects. A range between the maximum value $d_{max}$ and the minimum value $d_{min}$ of the parallax is called a parallax determination range.

At time t ($>t_{START}$), the maximum value $d_{max}$ and the minimum value $d_{min}$ are optimized for each block based on the position of a planar object which was estimated at $t_{START}$ and a parallax. Since it is physically impossible to take an image of an object that is more distant than the estimated planar object such as a road, a floor, or a wall it is meaningless to perform correlation processing on such an invisible object. Therefore, the parallax of the planar object is employed as the minimum value of the parallax determination range. In other words, the optimization is so made that the distance to the planar object is employed as the maximum value of the distance measurement range. The correlation processing is performed in the parallax determination range as optimized at time t ($>t_{START}$).

Figure 7:
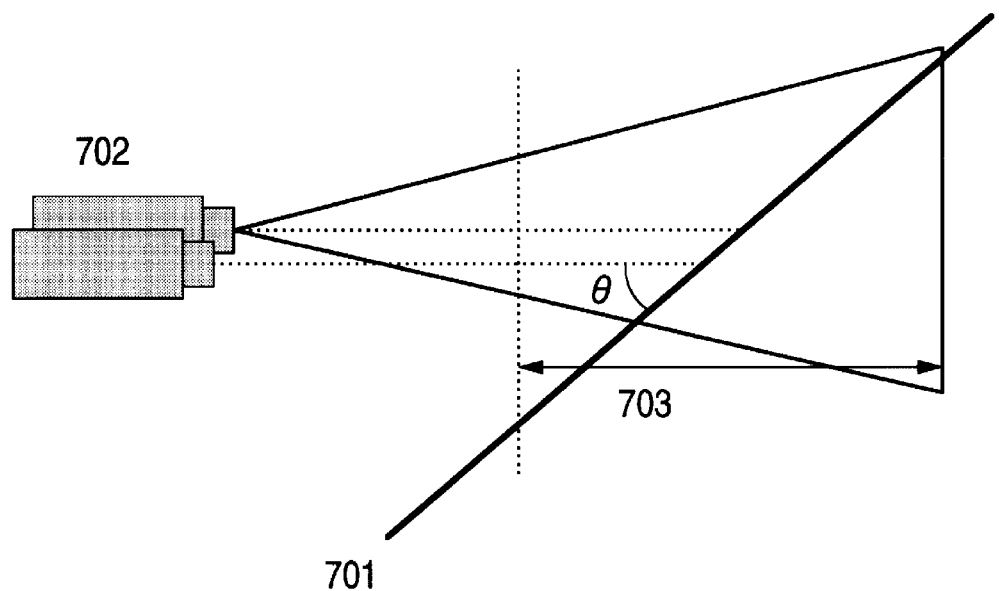
FIG. 7 illustrates a general positional relationship between image pickup devices and a planar object.

Conventionally, the parallax determination range is set from the maximum and minimum distances of objects to be measured in a real space that has been subjected to image pickup, and is constant for all blocks of an image. In contrast, in the invention, where image pickup devices 702 and a planar object 701 have a positional relationship shown in FIG. 7, distance measurement is not performed on an object that is more distant from the image pickup devices 702 than the estimated plane is. Therefore, the amount of calculation can be reduced greatly from the conventional case.

Although in the above embodiments the parallax of an object is used as the three-dimensional data, the invention can be practiced in the same manner even if the distance to an object is used instead of the parallax.

As described above, the invention provides a first advantage that by utilizing the Hough transform, the position of a planar object such as a road or a floor in a three-dimensional space can be estimated correctly in a global manner without being affected by other objects.

As a second advantage, since undetermined parallax data can be estimated by using an estimated position of a planar object, the object detection can be performed accurately by using the estimated planar object position as a reference for comparison.

As a third advantage, the amount of correlation calculation can be reduced by optimizing the parallax determination range for the correlation processing by using the position of a planar object.

What is claimed is:

1. A plane estimating method comprising the steps of:
   receiving a plurality of images that are produced by a plurality of image pickup means disposed at a predetermined interval;
   calculating three-dimensional data S(X, Y); $1 \leq X \leq M$, $1 \leq Y \leq N$ for each of rectangular segments obtained by dividing the received images into a plurality of M parts in a horizontal direction and into a plurality of N parts in a vertical direction through correlation between the received images;
   determining a plane passage straight line L(Y) by performing Hough transform on M three-dimensional data corresponding to rectangular segments belonging to a horizontal area GL(Y) of the received images;
   performing the determining step on all horizontal areas GL(Y), $1 \leq Y \leq N$, to thereby determine N plane passage straight lines L(Y), $1 \leq Y \leq N$; and
   estimating a position of a planar object in a three-dimensional space based on the N plane passage straight lines L(Y), $1 \leq Y \leq N$.

2. The plane estimating method according to claim 1, further comprising the steps of:
   calculating an angle θ(Y) of a perpendicular to both of a Y axis and each of the N plane passage straight lines L(Y), $1 \leq Y \leq N$, to obtain N angles θ(Y), $1 \leq Y \leq N$;
   calculating a central angle value $θ_R$ of the N angles θ(Y), $1 \leq Y \leq N$; and
   replacing all of the angles θ(Y), $1 \leq Y \leq N$ with the central angle value $θ_R$, to obtain N angle-corrected plane passage straight lines L'(Y), $1 \leq Y \leq N$,
   wherein the estimating step estimates the position of the planar object based on the N angle-corrected plane passage straight lines L'(Y), $1 \leq Y \leq N$.

3. The plane estimating method according to claim 2, further comprising the steps of:
   calculating a distance ρ(Y) between the origin of a coordinate system of the three-dimensional data S(X, Y) and each of the N angle-corrected plane passage straight lines L'(Y), $1 \leq Y \leq N$, to obtain N distances ρ(Y), $1 \leq Y \leq N$;
   determining a distance correction line by performing Hough transform on the N distances ρ(Y), $1 \leq Y \leq N$; and
   translating the N angle-corrected plane passage straight lines L'(Y), $1 \leq Y \leq N$ so that they intersect the distance correction line, to obtain N distance-corrected plane passage straight lines L"(Y), $1 \leq Y \leq N$,
   wherein the estimating step estimates the position of the planar object based on the N distance-corrected plane passage straight lines L"(Y), $1 \leq Y \leq N$.

4. An object detecting apparatus comprising:
   a plurality of image pickup means disposed at a predetermined interval, for producing a plurality of received images;
   a correlation processing section for producing three-dimensional data of objects according to triangulation through correlation between the plurality of received images;
   a plane estimating section for estimating a position of a planar object in a three-dimensional space by performing Hough transformation on the three-dimensional data
   wherein said three-dimensional data S(X, Y) are calculated; $1 \leq X \leq M$, $1 \leq Y \leq N$, for each rectangular segment obtained by dividing the received images into a plurality of M parts in a horizontal direction and into a plurality of N parts in a vertical direction through correlation between the received images;
   a plane passage straight line L(Y) is determined by performing Hough transform on M three-dimensional data corresponding to rectangular segments belonging to a horizontal area GL(Y) of the received images;

a plurality of N plane passage straight lines L(Y), 1≦Y≦N, are determined on all horizontal areas GL(Y), 1≦Y≦N; and, a position of a planar object in three-dimensional space is estimated on the N plane passage straight lines L(Y).

5. An object detecting apparatus comprising:

a plurality of image pickup means disposed at a predetermined interval, for producing a plurality of received images;

means for producing three-dimensional data of objects for respective rectangular segments of the plurality of received images;

a plane estimating section for estimating a position of a planar object in a three-dimensional space based on the three-dimensional data;

means for producing, by using the position of the planar object, three-dimensional data for part of the rectangular segments for which three-dimensional data could not be produced, to obtain interpolated three-dimensional data; and means for detecting an object that is located at a position different than the planar object when viewed from the plurality of image pickup means based on the interpolated three-dimensional data wherein said three-dimensional data S(X, Y) are calculated; 1≦X≦M, 1≦Y≦N, for each rectangular segment obtained by dividing the received images into a plurality of M parts in a horizontal direction and into a plurality of N parts in a vertical direction through correlation between the received images;

a plane passage straight line L(Y) is determined by performing Hough transform on M three-dimensional data corresponding to rectangular segments belonging to a horizontal area GL(Y) of the received images;

a plurality of N plane passage straight lines L(Y), 1≦Y≦N, are determined on all horizontal areas GL(Y), 1≦Y≦N; and, a position of a planar object in three-dimensional space is estimated on the N plane passage straight lines L(Y).

6. An object detecting apparatus comprising:

a plurality of image pickup means disposed at a predetermined interval, for producing a plurality of received images;

means for estimating a position of a planar object in a three-dimensional space based on the plurality of received images; and means for producing three-dimensional data of an object except for an object that is more distant from the plurality of image pickup means than the planar object is wherein said three-dimensional data S(X, Y) are calculated; 1≦X≦M, 1≦Y≦N, for each rectangular segment obtained by dividing the received images into a plurality of M parts in a horizontal direction and into a plurality of N parts in a vertical direction through correlation between the received images;

a plane passage straight line L(Y) is determined by performing Hough transform on M three-dimensional data corresponding to rectangular segments belonging to a horizontal area GL(Y) of the received images;

a plurality of N plane passage straight lines L(Y), 1≦Y≦N, are determined on all horizontal areas GL(Y), 1≦Y≦N; and, a position of a planar object in three-dimensional space is estimated on the N plane passage straight lines L(Y).

* * * * *